United States Patent Office 2,832,261
Patented Apr. 29, 1958

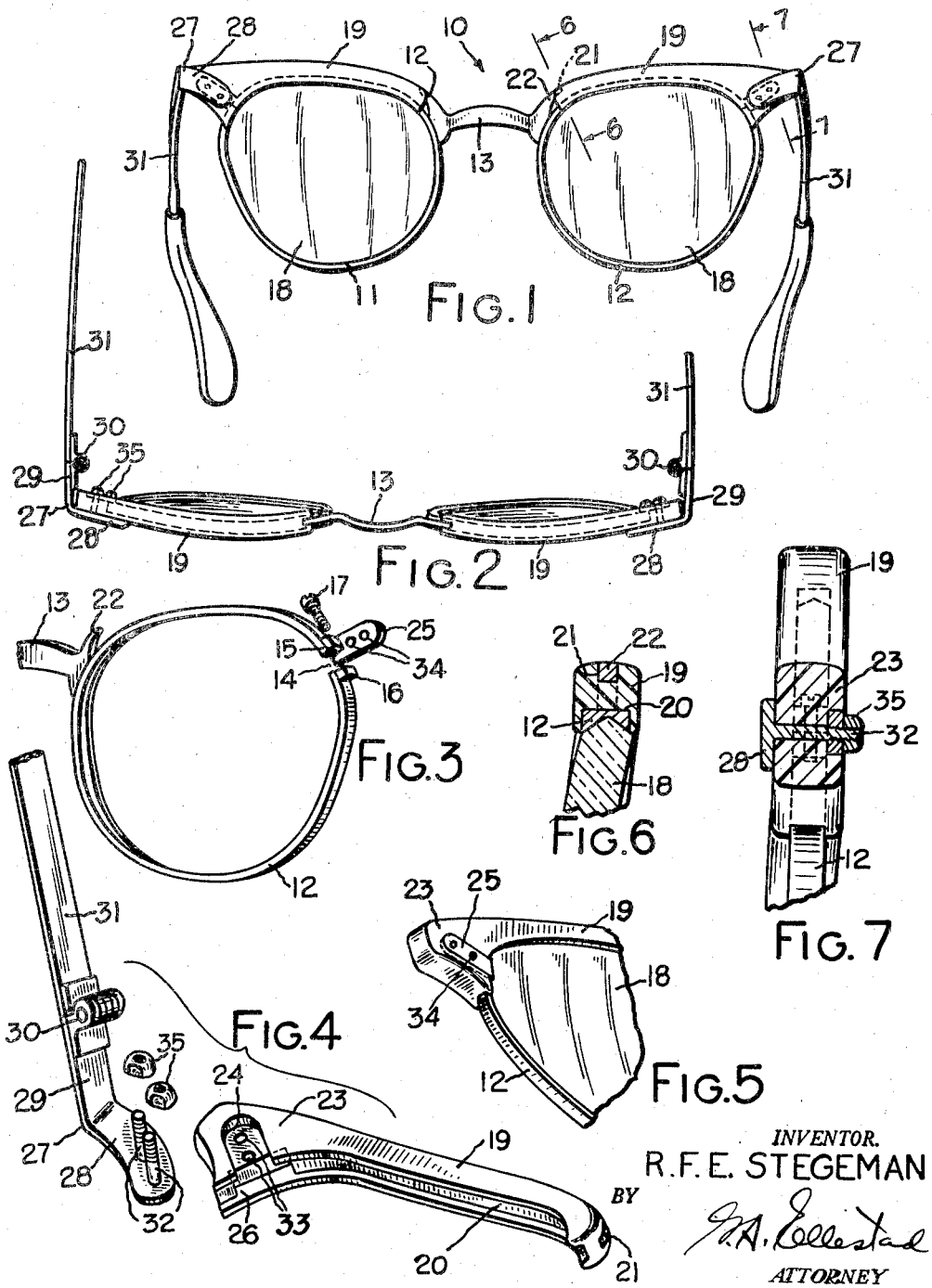

2,832,261
SPECTACLE FRAME WITH NON-METALLIC RIM PARTS

Raymond F. E. Stegeman, Greece, N. Y., assignor to Bausch & Lomb Optical Company, Rochester, N. Y., a corporation of New York Application May 6, 1955, Serial No. 506,409

1 Claim. (Cl. 88—41)

This invention relates to spectacle frames having combined metallic and non-metallic parts and more particularly it has reference to a construction for connecting the parts and supporting the temples in such frames.

One of the objects of my invention is to provide an improved spectacle frame of the type described which will be efficient in operation and so constructed that the lenses, non-metallic parts and temples may be readily interchanged. Another object is to provide such a frame which will have improved means for connecting the metallic and non-metallic parts and adjustably supporting the temples. A further object is to provide a frame of the type described which will be sturdy in construction yet neat in appearance and capable of being adjusted so as to fit the facial characteristics of a patient. These and other objects and advantages reside in certain novel features of construction, arrangement and combination of parts as will hereinafter be more fully explained and pointed out in the appended claim.

Referring to the drawings:

Fig. 1 is a front view of a spectacle frame embodying my invention.

Fig. 2 is a top plan view thereof with the temples broken away.

Fig. 3 is a front perspective view of one of the metallic lens rims with parts shown in separated relation.

Fig. 4 is an exploded view showing a non-metallic rim part and a temple arm and temple.

Fig. 5 is a fragmentary rear view showing the temporal portion of a lens rim and associated parts before the temple arm is attached.

Fig. 6 is a sectional view taken on line 6—6 of Fig. 1.

Fig. 7 is a sectional view taken on line 7—7 of Fig. 1.

A preferred embodiment of my invention is disclosed in the drawings wherein 10 indicates, generally, a spectacle frame having the two grooved metallic lens rims 11 and 12 connected by a metallic bridge 13 which has two ends soldered to the respectively adjacent lens rims. Each lens rim is split at its upper temporal portion, as shown at 14, and the upper apertured lug 15 and the lower threaded lug 16 are secured, respectively, to the upper and lower ends of the split lens rim so that by means of screw 17 the lenses 18 are detachably mounted in the lens rims 11 and 12.

A non-metallic member or rim part 19 extends along the top of each of the lens rims 11 and 12 from its nasal portion to its temporal portion. The under side of each rim part 19 has a continuous groove 20 in which is positioned the upper part of the metallic lens rim. The inner or nasal portion of each rim part 19 has a notch 21 which receives a projection 22 formed on the bridge 13 so that the rim part is thereby detachably held at its nasal portion.

Each member 19 terminates in an enlarged temporal portion 23 which has formed on its rear face a recess 24 which is in communication with the groove 20. Each metallic lens rim 11 and 12 has secured to its upper temporal portion, adjacent to and rearwardly of the lugs 15 and 16, an apertured projection 25 which is positioned in the recess 24 with the lugs 15 and 16 located in an enlargement 26 formed in the temporal part of the groove 20.

A metallic arm 27 has a first part 28 comprising a flat plate which is positioned on the front side of the temporal portion 23. The arm 27 has a second part 29 which is formed at a substantially right angle to the first part 28 so that the part 29 extends rearwardly of the temporal portion 23. Soldered to the rear end of part 29 is a temple hinge 30 by means of which the temple 31 is pivotally mounted on the metallic arm 27. The inner face of the first part 28 has secured thereto, as by soldering, a pair of rearwardly projecting fastening elements such as screws 32 which extend through aligned apertures 33 and 34 which are formed, respectively, in the temporal portion 23 and the projection 25. The fastening elements are held in place by means of the nuts 35 which engage the threaded ends of the screw 32.

From the foregoing, it will be apparent that I am able to attain the objects of my invention and provide a spectacle frame having improved means for connecting the metallic and non-metallic parts which are embodied in the frame. With my improved construction, it is possible to readily interchange the non-metallic members or rim parts 19 in order to provide different desired color combinations by utilizing rim parts of various colors. It is also possible to interchange the temple connections as well as provide an improved construction which will permit various adjustments of the temples relative to the lenses. Thus, the rearwardly extending parts 29 of the arms 27 may be readily bent so as to adjustably position the temples in any desired location relative to the lenses. With this construction, the lens rim connecting lugs 15 and 16 are completely hidden from view so that a neat-appearing and firmly constructed spectacle frame is thereby produced. Various modifications may obviously be made without departing from the spirit of the invention as pointed out in the appended claim.

I claim:

In an ophthalmic mounting the combination of a metallic rim surrounding a lens, said rim being split at its upper temporal side, a pair of lugs carried by the respective ends of the split rim, a screw connecting the lugs for detachably holding the lens in the rim, a non-metallic member extending along the top of the rim and having an enlarged temporal portion provided with a recess on its rear face and means for connecting said temporal portion to the rim comprising an apertured projection connected to the rear side of the rim adjacent to said lugs, said projection being positioned in said recess, a flat, plate-like metallic arm having a substantially right angled bend providing a first part and a second part, and mounted with the first part on the front face of said temporal portion and the second part having an unsupported and portion extending rearwardly of said temple portion, said parts being bendable relative to each other, fastening elements secured to the inner face of said first part and extending through aligned apertures in said portion and projection, and a temple hingedly carried by said end portion of the second part whereby the non-metallic member is detachably secured to the metallic rim and the temple may be adjustably positioned relative to the lens by bending the second part of the arm.

References Cited in the file of this patent

UNITED STATES PATENTS

| | | |
|---|---|---|
| 2,634,655 | Knowles et al. | Apr. 14, 1953 |
| 2,682,199 | Weissman | June 29, 1954 |
| 2,696,756 | Salierno | Dec. 14, 1954 |

FOREIGN PATENTS

| | | |
|---|---|---|
| 704,696 | Great Britain | Feb. 24, 1954 |

U. S. DEPARTMENT OF COMMERCE
PATENT OFFICE

CERTIFICATE OF CORRECTION

Patent No. 2,832,261      Raymond F. E. Stegeman      April 29, 1958

It is hereby certified that error appears in the printed specification of the above numbered patent requiring correction and that the said Letters Patent should read as corrected below.

Column 2, line 54, for "and", second occurrence, read -- end --.

Signed and sealed this 10th day of June 1958.

(SEAL)
Attest:
KARL H. AXLINE
Attesting Officer

ROBERT C. WATSON
Commissioner of Patents